United States Patent
Elofson

[11] Patent Number: 5,883,354
[45] Date of Patent: Mar. 16, 1999

[54] METHOD OF FASTENING A STRIP OF THIN SHEET METAL ON A CONICAL SEPARATION DISC OF THIN SHEET METAL, AND A SEPARATION DISC PROVIDED IN THIS MANNER WITH A STRIP OF THIN SHEET METAL

[75] Inventor: John Elofson, Huddinge, Sweden

[73] Assignee: Alfa Laval AB, Lund, Sweden

[21] Appl. No.: 836,109

[22] PCT Filed: Aug. 23, 1996

[86] PCT No.: PCT/SE96/01045

§ 371 Date: May 5, 1997

§ 102(e) Date: May 5, 1997

[87] PCT Pub. No.: WO97/09120

PCT Pub. Date: Mar. 13, 1997

[30] Foreign Application Priority Data

Sep. 8, 1995 [SE] Sweden ................................ 9503092

[51] Int. Cl.$^6$ .................................................. B23K 11/06
[52] U.S. Cl. ........................................... 219/83; 219/117.1
[58] Field of Search .................................. 219/67, 81, 82, 219/83, 105, 117.1; 494/74, 79, 85

[56] References Cited

U.S. PATENT DOCUMENTS

| 690,958 | 1/1902 | Hunter | 219/105 |
| 1,249,532 | 12/1917 | Nevins | 219/105 |
| 1,714,690 | 5/1929 | Smith et al. | 219/83 |
| 3,410,982 | 11/1968 | Morris et al. | 219/105 |
| 3,541,296 | 11/1970 | Rudd | 219/117.1 |
| 4,575,607 | 3/1986 | Rozmus | 219/83 |
| 5,473,133 | 12/1995 | Peterson | 219/81 |
| 5,477,021 | 12/1995 | Kohlstette et al. | 219/121.63 |
| 5,654,992 | 8/1997 | Uraki et al. | 219/82 |

FOREIGN PATENT DOCUMENTS

| 0 444 271 | 9/1991 | European Pat. Off. . | |
| 0 559 527 | 9/1993 | European Pat. Off. . | |
| 1139189 | 6/1957 | France | 219/83 |
| 32204573 | 12/1983 | Germany | 219/83 |
| 57-94478 | 6/1982 | Japan | 219/117.1 |
| 58-168483 | 10/1983 | Japan | 219/117.4 |

*Primary Examiner*—Gregory L. Mills
*Attorney, Agent, or Firm*—Fish & Richardson P.C.

[57] ABSTRACT

Conical separation discs of thin sheet metal intended for centrifugal separators have, as a rule, spacing members in the form of thin strips welded onto one of their sides. For avoiding local overheating of a separation disc, when a strip is to be welded onto the separation disc by roll welding, the strip is formed with at least one ridge extending in the longitudinal direction of the strip, the width of the ridge being substantially smaller than that of the strip. In this way, the contact area between the strip and the separation disc will become very small in the welding area, and only a limited amount of energy is needed for the welding.

7 Claims, 4 Drawing Sheets

METHOD OF FASTENING A STRIP OF THIN SHEET METAL ON A CONICAL SEPARATION DISC OF THIN SHEET METAL, AND A SEPARATION DISC PROVIDED IN THIS MANNER WITH A STRIP OF THIN SHEET METAL

FIELD OF THE INVENTION

Conical separation discs for centrifugal separators are traditionally produced by thin sheet metal and are usually provided with elongated strips also produced from thin sheet metal and fastened onto one side of the separation discs by welding. When several separation discs are stacked onto each other in the rotor of a centrifugal separator the:strips serve as spacing members for forming flow spaces between the separation discs.

BACKGROUND OF THE INVENTION

The welding method normally used in connection with fastening of strips of this kind onto separation discs is spot welding. This welding method is cheap and has been considered sufficient from different starting points. Thus, brazing has long been abandoned as a connection method, and welding of the strips along all of the edges thereof has been considered unnecessarily expensive and not required.

However, in certain connections new requirements have lately been set up on the connection of the strips with the separation discs, meaning that the edges of each strip have to be sealingly connected with its separation disc, so that no pockets are formed, which are difficult to clean.

These new requirements have brought up the question how, in the cheapest and most practical way, a continuous weld joint can be provided through resistance welding between a thin strip of sheet metal of this kind and a conical separation disc also produced from thin sheet metal so that heat, developed during the welding, will not cause deformation of the separation disc. A conical separation disc is usually produced by pressure turning of a circular or annular planar piece of thin sheet metal and it obtains, as a consequence of this treatment, stresses built into the sheet material, which may easily deform the separation disc upon local heating thereof.

A problem in connection with use of conventional roller welding for obtaining a continuous weld joint between a strip and a separation disc is that a relatively large contact surface comes up between the strip and the separation disc, when a roll welding electrode is rolled along the strip and presses it against the separation disc. This contact surface comes up in a welding area extending across the whole of the strip and over a distance in the longitudinal direction of the strip. In order to obtain melting in this relatively large contact area relatively much energy has to be used, which leads to an undesired strong heating of the separation disc.

Theoretically it would be possible to limit the welding to only a small part of the width of the strip for minimizing the heat development during a welding operation. However, this would require that both the weld electrode applied and pressed against the strip and the weld electrode applied against the separation disc were isolated electrically over certain parts of their surfaces intended for contact with the strip and the separation disc, respectively, and further that the uninsulated area or areas of the respective contact surfaces of the weld electrodes were to be placed extremely accurately in relation to both each other and the strip all the way along where a weld joint should be obtained. Considering that the strips here in question have a width of about 3–6 mm, that a weld joint of maximum 1 mm width is deemed desirable, that the strip is to be applied onto a curved (conical) surface and that the strip (weld joint) should not always be straight and extend along, but sometimes at an angle, to a generatrix of the separation disc, an apparatus for obtaining this would become very complicated and expensive.

For resolving the problem of undesired local overheating of a conical separation disc, when a narrow strip of the kind here in question is to be connected by resistance welding with a separation disc through two parallel weld joints along the edges of the strip, it has been suggested in EP 0 444 271-A3 that a weld electrode in the form of a relatively narrow roller should be rolled across the strip in its cross direction and that welding current should be switched on only when the roller passes over the edges of the strip, where a weld joint should be obtained, and be switched off while the roller rolls across the central part of the strip between the edges. Thus, the roller has to be rolled across the strip several times before two continuous weld joints have been obtained along the whole of the strip. It is also suggested in EP 0 444 271-A3 that the weld roller should be rolled along the entire circumference of the separation disc and that welding should thus occur only when the roller passes across the edges of the strips in question, which in the case disclosed are placed such that they extend along the generatrices of the conical separation disc.

From various starting points it may be questioned whether the welding method suggested in EP 0 444 271-A3 is really performable without obtaining of an undesired local overheating of the separation disc. If it would be possible, after all, the weld roller would probably have to be very narrow, which makes it apparent that a welding operation performed in this manner would take far too long to be useful in practice.

SUMMARY OF THE INVENTION

With this background it is an object of the present invention to provide a new method useful in practice to establish by resistance welding a continuous weld joint between a strip of the above discussed kind and a conical separation disc produced from thin sheet metal, which weld joint extends in the longitudinal direction of the strip. The method should thus make it possible to weld the strip onto the separation disc without undesired local overheating of the latter. Futhermore, the method should make possible a rapid welding operation at an acceptable cost.

This object can be obtained in a way such that a strip of thin sheet metal having a certain width is placed on a conical separation disc and is pressed thereagainst between a first weld electrode in contact with the strip and a second weld electrode in contact with the separation disc, the invention being characterized by choosing a strip of a kind having on one of its sides at least one ridge, which extends along the strip and has a width substantially smaller than the width of the strip, placing the strip on the separation disc with said ridge facing the separation disc, causing a roll welding electrode, constituting said first welding electrode, to roll under pressure against and along the strip such that in a welding area the ridge is pressed against the separation disc, and conducting in the welding area a current between the welding electrodes,which is so adapted that at least a part of said ridge melts in the welding area and gradually forms a continuous weld joint between the strip and the separation disc.

During a welding operation performd in this way a very small contact area is obtained in said welding area between the strip and the separation disc as a consequence of said ridge being substantially narrower than the strip. To accomplish melting of material in the strip in such a small contact area there is required a correspondingly small amount of energy. Thus, it is possible to create a continuous weld joint without undesired overheating of the separation disc.

By the invention it is possible during the welding operation to use a minimum of energy. Thus, it is sufficient to use only so much energy that is required for partial melting of the ridge in the welding area. After such a partial melting of the ridge the contact area between the ridge and the separation disc is enlarged, and the size of the current conducted between the electrodes can be adapted such that the current will become insufficient for continued melting of the ridge, when said contact area has reached a certain size. The heating of the strip and the separation disc by the current as used is prevented in this way to lead automatically to undesired local overheating.

To obtain a desired spacing function of the strip it is suitable, however, that a current conducted between the electrodes is adapted such that the ridge in the welding area melts substantially completely, whereby there is formed a contact area between the strip and the separation disc so large that, when the strip gets into contact with the separation disc across the whole of its width, the current will become insufficient for continued melting of the strip.

Melting of said ridge to this extent is not necessary if the strip should not operate as a spacing member but have some other function in an interspace between two separation discs.

If there is a need to provide tight weld joints between a strip and a separation disc along both of the edges of the strip, a strip is chosen according to the invention which on one of its sides has two spaced ridges extending along the strip; one at each of the strip edges. If a strip of this kind should serve as a spacing member, it is suitable to conduct a current between the weld electrodes adapted such that it will be insufficient for continued melting of the strip only when a portion of the strip situated between the ridges gets in contact with the separation disc.

BRIEF DESCRIPTION OF THE DRAWINGS

The invention is described in the following with reference to the accompanying drawings, in which.

DETAILED DESCRIPTION

Figure 1:
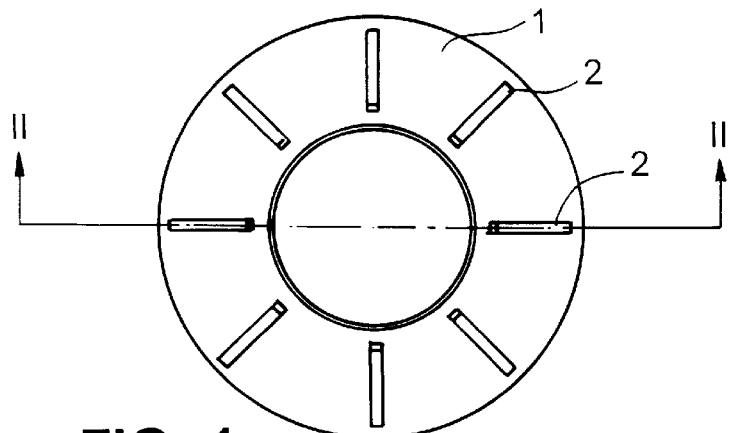
FIG. 1 shows a frusto-conical separation disc of thin sheet metal, seen from its most narrow end and provided with several narrow strips of thin sheet metal welded onto it.

FIG. 1 shows a frusto-conical separation disc 1 produced from thin sheet metal and seen from above, and strips 2 also produced from thin sheet metal and welded onto the outside or upperside of the separation disc 1. The strips 2 extend in this case in straight paths along the generatrices of the conical separation disc 1. Each strip can extend, however, along any desired straight or curved path on the separation disc. Alternatively, the strips could be welded onto the inside or underside of the separation disc 1.

Figure 2:
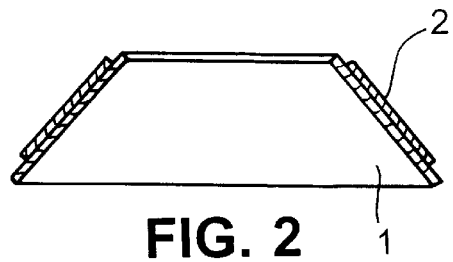
FIG. 2 shows a cross section through part of the separation disc in FIG. 1, taken along the line II—II in FIG. 1.

FIG. 2 shows a cross section through the separation disc 1 taken along the line II—II in FIG. 1. As can be seen, the inside or underside of the separation disc is entirely smooth. When several separation discs 1 are stacked onto each other the strips 2 serve, among other things, as spacing members between the separation discs. The interspaces thus formed between the separation discs are supposed to serve as separation spaces in the rotor of the centrifugal separator.

The thickness of a separation disc 1 of this kind may vary depending on, among other things, the size of the separation disc. For instance the size may be 0.6 mm. Even the thickness of the sheet metal strips 2 may vary depending on the desired thickness of the interspaces between the separation discs stacked onto each other. The thickness of the spacing strips are often of the same magnitude as the thickness of the separation discs.

Figure 3:
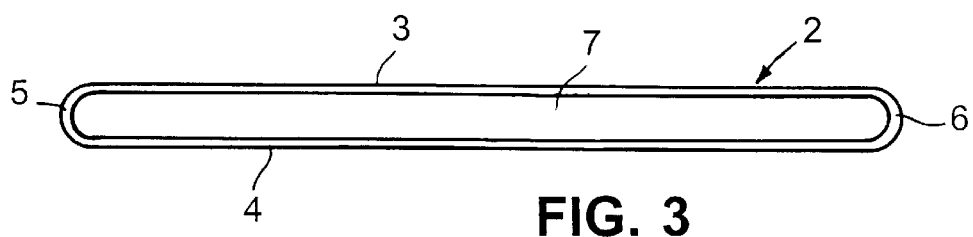
FIG. 3 shows a strip of thin sheet metal formed in accordance with the invention.
Figures 4, 5:
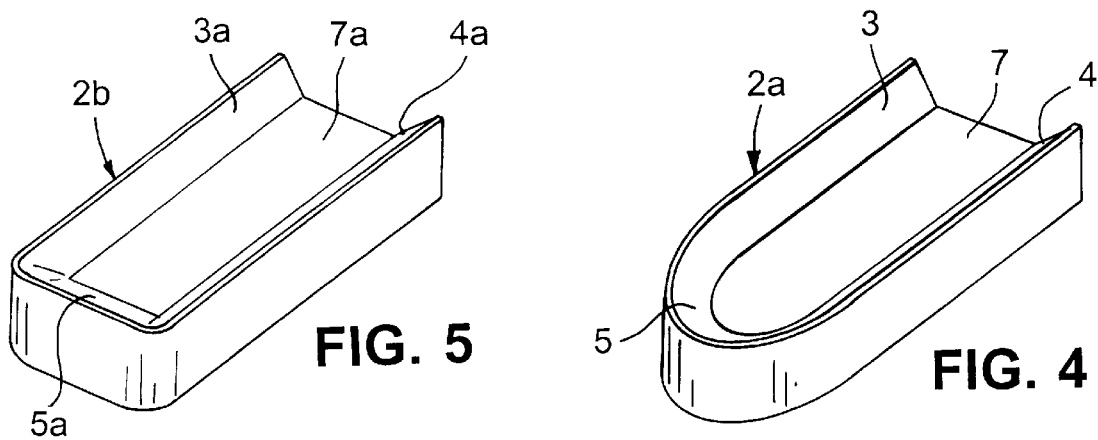
FIGS. 4 and 5 show alternative embodiments of an end portion of a strip according to FIG. 3.

FIG. 3 shows a view of a strip 2, which has not yet been welded onto a separation disc. The strip is shown from the one of its sides that is to face the separation disc. FIGS. 4 and 5 show alternatively formed end portions 2a and 2b, respectively, of the strip.

As can be seen, the strip 2 on one of its sides has two ridges 3 and 4 extending along the respective edges of the stip. In FIG. 5 these ridges are designated 3a and 4a, respectively. Even at the ends of the strip ridges 5 and 6 are formed which interconnect the ridges 3 and 4. In FIG. 5 a ridge of this kind is designated 5a.

As can be seen, each one of the ridges 3–6 has a cross section of a kind such that the ridge is broadest at its base and gets narrower towards its crest.

In an area 7 surrounded by the ridges 3–6 the strip 2 is entirely smooth. A corresponding area of the strip 2b in FIG. 5 is designated 7a.

Figure 6:
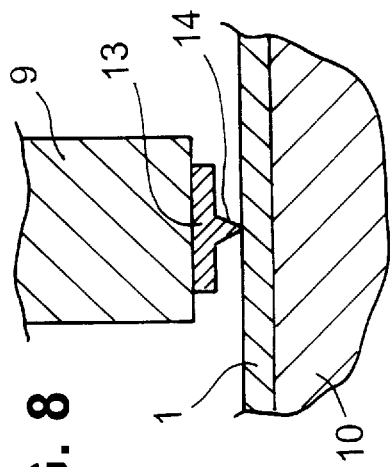
FIG. 6 shows a cross section through a separation disc and a strip according to FIG. 3, applied onto the separation disc between two weld electrodes, before welding has occurred.

FIG. 6 shows in a cross section a strip 2 according to FIG. 3, placed on the upper side of a separation disc 1 with its ridges 3 and 4 in contact therewith. Between the ridges 3 and 4 there is formed a space 8, in which the strip 2 has no contact with the separation disc 1.

On top of the strip 2 in FIG. 6 there is placed a first welding electrode in the form of a roller 9. The roller 9 is oriented with its rotational axis extending across the longitudinal direction of the strip 2, so that it can be rolled on the strip 2 therealong.

Figure 10:
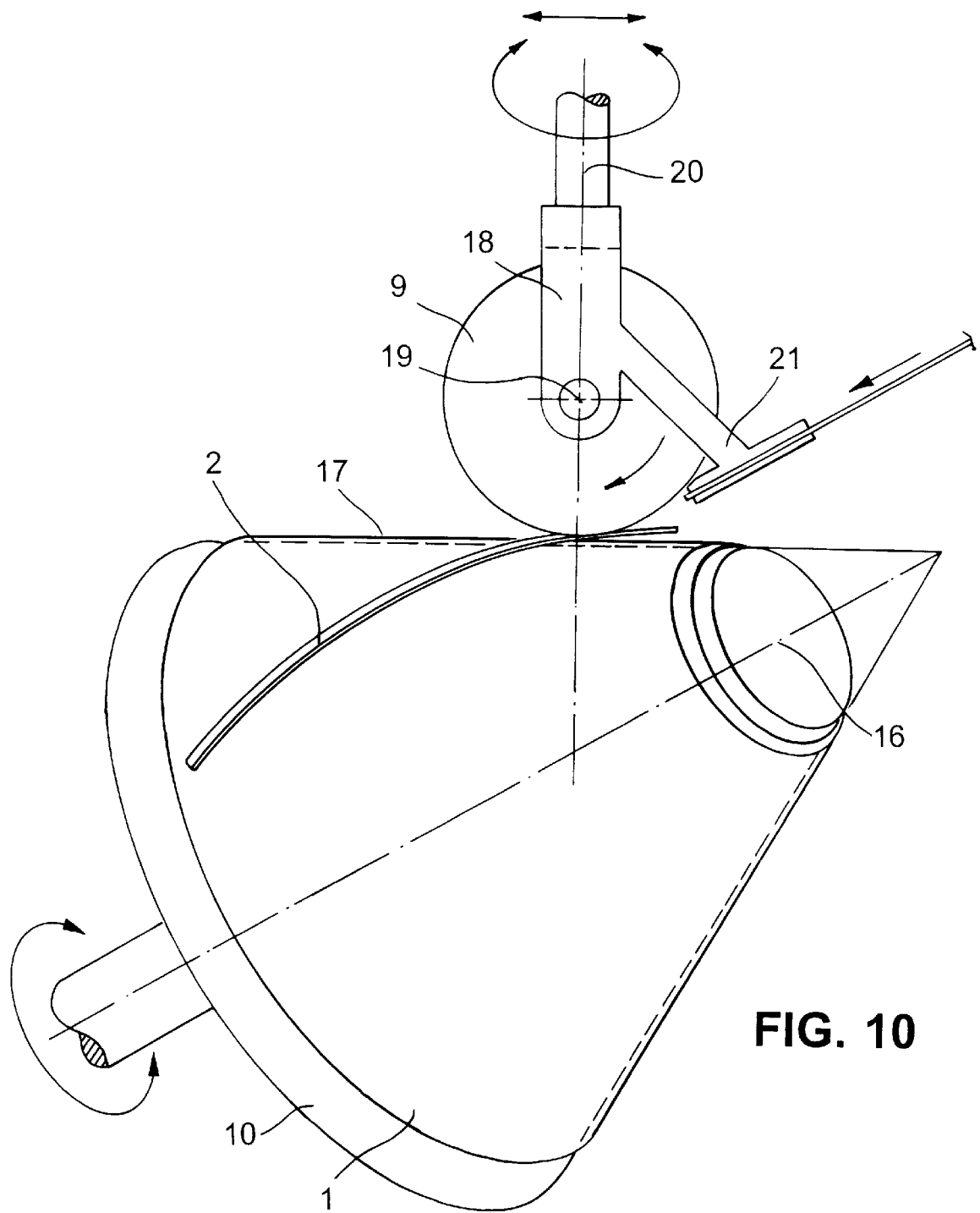
FIG. 10 shows equipment for welding of the strip onto a conical separation disc.

On its underside the separation disc 1 is supported by a second welding electrode 10, which may have the form of a solid conical body (see FIG. 10).

The welding electrodes 9 and 10 are connectable to a source of current in a conventional manner (not shown) and arranged for roll welding by means of conventional equipment.

During a welding operation the roller 9 is rolled along the strip 2 while being pressed thereagainst. The compression of the strip 2 and separation disc 1 has to be so strong that a contact pressure required for welding of the strip and the separation disc together comes up in the intended welding area. Since the strip can be pressed to contact with the separation disc only through the ridges 3 and 4, the crests of which are very narrow, a very small contact area is obtained in the intended welding area between the strip and the separation disc. A possibly pulsed welding current adapted with regard to the size of the contact area is conducted between the welding electrodes 9 and 10, while the welding electrode or roller 9 is rolled along the strip 2.

While the roller 9 moves along the strip 2 the ridges 3 and 4 and possibly part of the material in the separation disc 1 melt gradually to a liquid state, whereby the contact area in the welding area between the strip and the separation disc is enlarged every moment. The welding current then need not be stronger than so that its ability of melting material in the welding area automatically ceases, when a desired amount of material has been melted and said contact area has got a desired size. When the central area 7 of the strip 2 gets into contact with the separation disc 1, the size of the contact area increases strongly, which can be utilized for suitable adaptation of the strength of the welding current, so that the ridges 3 and 4 will safely melt entirely without the welding current after that having to cause continued melting in the welding area.

Figure 7:
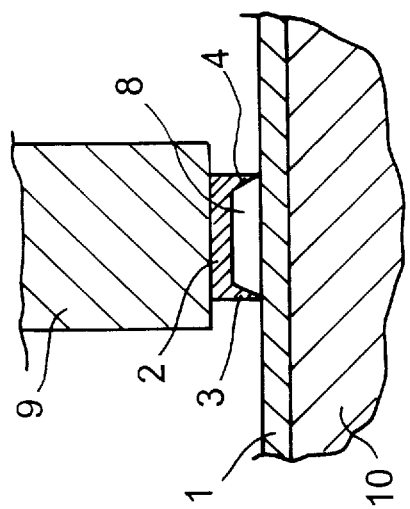
FIG. 7 shows a cross section similar to that in FIG. 6 but showing the separation disc and the strip after welding has occurred, FIGS. 8 and 9 correspond to FIGS. 6 and 7,respectively, the strip having a different shape.

From FIG. 7 it can be seen how two weld joints 11 and 12 have been formed between the separation disc 1 and the respective edge portions of the strip 2 after the material in the ridges 3 and 4 and parts of the material in the separation disc 1 have melted to liquid form and after that solidified again. As can be seen, the strip 2 has got into contact with the separation disc 1 across its central area 7 (see FIGS. 3 and 4) without any weld joint having been formed in this area. Some liquid material has instead moved outwardly to the areas outside the edges of the strip.

Figure 8:
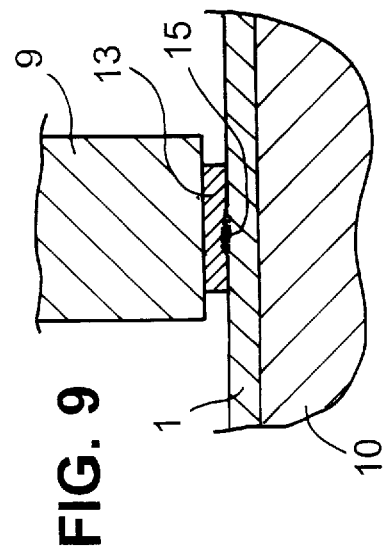
Figure 9:
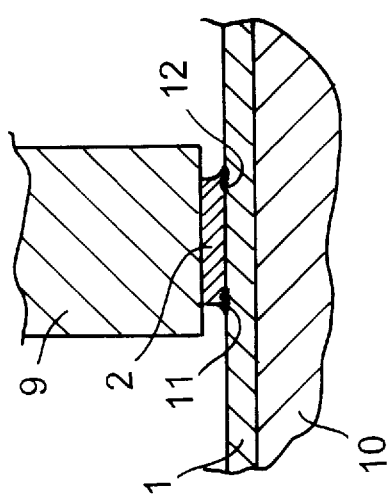

The FIGS. 8 and 9 illustrate how a metal sheet strip 13 having only one centrally situated ridge 14, extending along the strip 13, is welded onto a separation disc 1. The same welding electrodes 9 and 10 as in FIGS. 6 and 7 may be used in this case. One single weld joint 15 is formed in this case, which in many connections can be sufficient. If a strip of this kind is to extend along a generatrix of the separation disc 1, the strip 13 may be given a small curvature, seen in a cross section trough the strip, which is of the same magnitude as or insignificantly stronger than the curvature of the upper side of the separation disc 1 onto which it shall be welded. (The curvature of the separation disc is not shown in the FIGS. 8 and 9). Hereby it can be avoided that gaps come up along the edges of the strip or between the strip and the separation disc.

FIG. 10 shows schematically certain parts of an apparatus for welding metal sheet strips onto frusto-conical separation discs.

On a frusto-conical solid body forming a supporting welding electrode 10 there is placed a separation disc 1, which is produced from thin sheet metal and has a form substantially coinciding with that of the welding electrode 10. The welding electrode 10 is rotatable around an inclined axis 16, constituting also the center axis of the electrode 10, and is arranged upon rotation around this axis to entrain the separation disc 1 in its rotational movement. The axis 16 is inclined in a way such that a generatrix 17 of the separation disc 1 always extends horizontally and simultaneously is situated in the same vertical plane as the inclined axis 16.

A roller forming a roll welding electrode 9 is suspended from a frame 18, which is movable horizontally from the left to the right with respect to FIG. 10 in parallel with said generatrix 17. The roll welding electrode 9 is rotatable relative to the frame 18 around its center axis 19, which extends horizontally, whereas the frame 18 together with the roller 9 is rotatable around a vertical axis 20. The frame 18 is suspended in a way such that the vertical axis 20 during movement of the frame horizontally is all the time situated in the same vertical plane as the axis 16 and the generatrix 17.

As can further be seen from FIG. 10 the frame 18 is equipped with a device 21 for guiding a sheet metal strip 2 into an interspace between the roll welding electrode 9 and the separation disc 1 in an area where welding is to take place. The metal sheet strip 2 has previously been part of a continuous long strip, which during a welding operation is supplied towards the guiding device 21. Before the strip reaches the guiding device 21 it is divided into pieces having a desired length by means of a cutting machine (not shown) after which the pieces, i.e. the strips 2, are directed into the guiding device 21. Whereas the ridges 3 and 4 ( see FIG. 3) are formed in the strip already before it is divided, the ridges 5 and 6 are formed in said cutting machine. The welding electrodes 9 and 10 are connected in a known manner (not shown) to a source of current.

The welding operation is started with the frame 18 and the roller 9 being situated in the vicinity of the widest end of the separation disc 1, i.e. to the left in FIG. 10. Here the frame 18 is adjusted to a desired rotational position around the axis 20, so that the device 21 can quide the strip 2 in a desired direction relative to the generatrix 17 and so that the rotational axis 19 of the roller 9 itself will extend across the longitudinal direction of the strip. Thereafter one end of the strip 2 is inserted into the gap between the roller 9 and the separation disc 1 and the welding current circuit is closed. Simultaneously the electrode 10 and the separation disc 1 are caused to rotate around the axis 16 and the roller 9 is caused to move along the generatrix 17 while it is allowed to roll on and be pressed against the strip 2.

At the beginning, i.e. close to the widest end of the separation disc, the strip 2 forms in every point a relatively large angle to the generatrix of the separation disc through the point in question, but this angle decreases gradually as new parts of the strip 2 are welded onto the separation disc. Thus, the strip 2 when it is fastened to the separation disc will extend along a path that is curved in several planes. At the welding place where the roller 9 is situated in FIG. 10 the strip 2 extends substantially in parallel with the generatrix 17.

The rotation of the electrode 10, as well as the horizontal movement and rotation around the axis 20 of the frame 18, can be performed automatically according to a program supplied into a computer. Also the welding might be performed automatically. Thus, the strength of the welding current and/or possibly the pulsation of the welding current may have to be given certain values, when the welding electrode 9 is rolling along the main part of the strip 2, but other values when the roller passes across the end portions of the strip 2, when the size of the contact area between the strip 2 and the separation disc 1 through the ridges 3–6 is changed. The values for the strength of the current and possible pulsation of the current is to be determined empirically beforehand for each separate case with regard to, among other things, the material in and the thickness of the separation disc 1 and the strips 2.

By means of equipment of the described kind strips may be welded onto a separation disc along almost any path. The sidewise bending of a strip then needed is facilitated by the fact that the strip, during the welding, is locally heated and becomes soft in the welding area.

Figure 11:
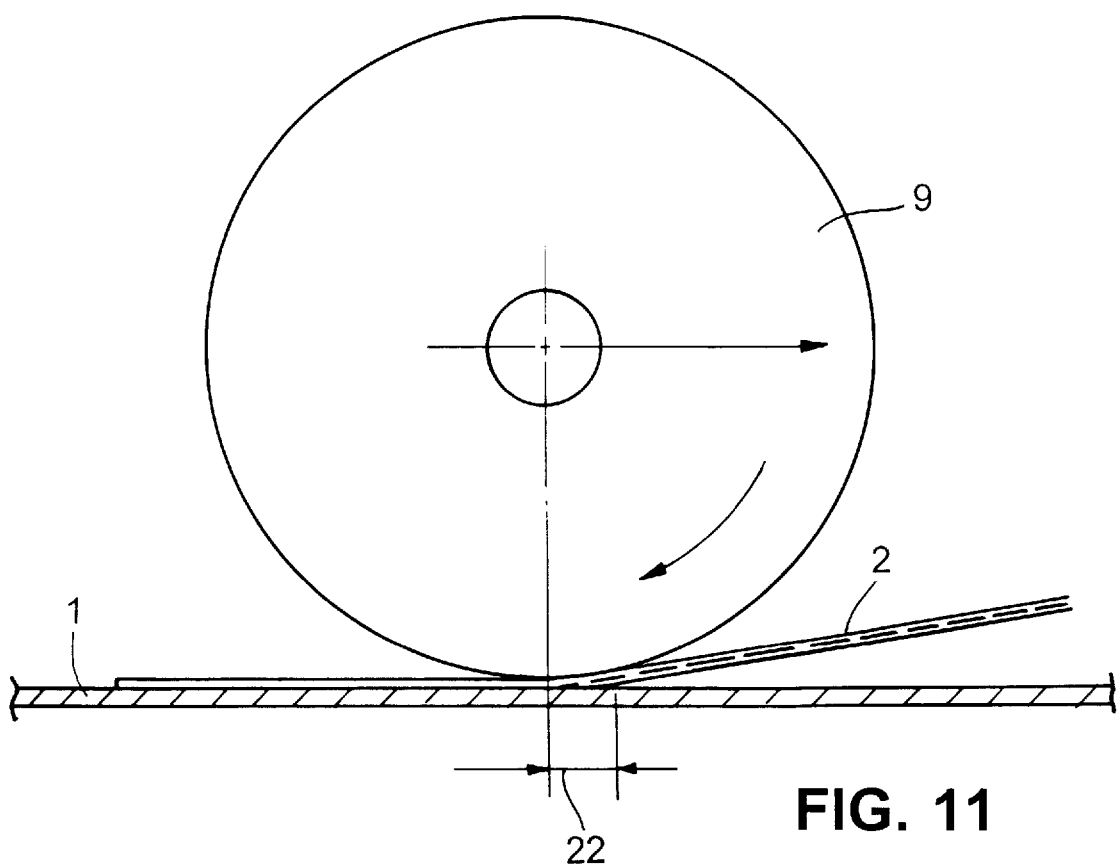
FIG. 11 shows part of the equipment in FIG. 10

FIG. 11 shows the roll welding electrode 9 seen from the side during a welding operation. A welding area 22 shown between two arrows is the zone in which melting occurs during the welding.

Figure 12:
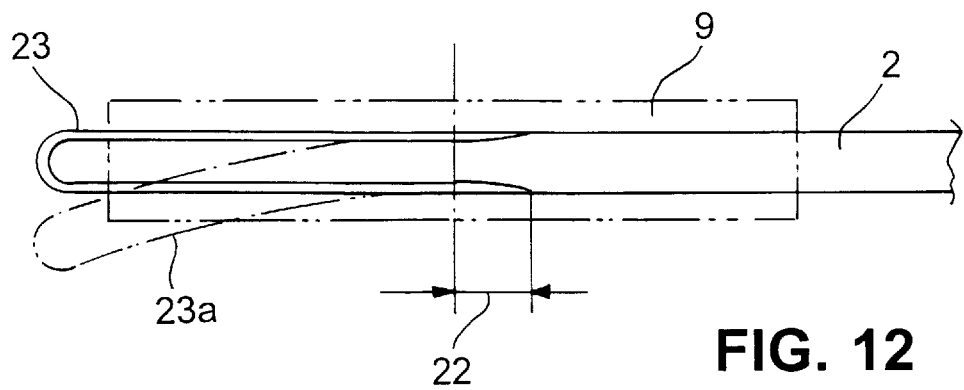
FIG. 12 illustrates a weld joint formed by means of equipment according to FIG. 10.

FIG. 12 illustrates the extension of a weld joint 23 accomplished at an end portion of a strip 2 of the kind shown in FIGS. 3 and 4. The roll welding electrode 9 is shown by dashdot lines. Even this figure shows the welding area 22 in which melting occurs during the welding. Some curved dashdot lines 23a show an alternative extension of a weld joint.

Both of the electrodes 9 and 10 may need to be subjected to cooling during welding so that their temperature is kept at a suitable level.

In the examples shown in the drawing the ridges 3,4 and 14 have been given a height of the same magnitude as the thickness of the rest of the strip 2, e.g. 0.4 mm a width not more than this. This relation can of course be different if this would be suitable. For obtaining as little heating as possible of the separation disc the ridges are preferably given the smallest possible height required for accomplishing satisfactory weld joints. However, the ridges 3 and 4 must not be too low, since the central portion of the strip between the ridges 3 and 4 may in this case get into contact with the separation disc 1, before the welding operation has started. This depends on the fact that the upper side of the separation disc is somewhat convex, which has not been shown in the FIGS. 6–9.

What is claimed is:

1. A method of fastening by resistance welding an elongated strip of thin sheet metal having a preselected width and a preselected thickness onto a substantially conical separation disc of thin sheet metal, the strip being applied onto the separation disc and pressed thereagainst between a first welding electrode in contact with the strip and a second welding electrode in contact with the separation disc, the method comprising:

selecting a strip having on one side thereof two ridges which extend along the strip spaced from each other, one at each longitudinal edge of the strip, each of the ridges having a base having a width substantially smaller than the preselected width of the strip and not larger than about the preselected thickness of the strip, placing the strip on the separation disc with the ridges facing the separation disc, causing a roll welding electrode constituting the first welding electrode to roll under pressure against and along the strip, so that in a welding area the ridges are pressed against the separation disc, and conducting in the welding area a current between the welding electrodes, the current being adapted to melt at least a part of each ridge in the welding area, such that the ridges gradually form continuous tight weld joints along the respective edges of the strip, leaving no pockets at said edges between the strip and the separation disc.

2. The method according to claim 1, comprising selecting a strip of a kind on which each of the ridges has a crest which is substantially narrower in-width than is the ridge at said base.

3. The method according to claim 2, comprising selecting a strip of a kind on which each of the ridges has a cross section extending from said base to said crest, said c ross sect ion having the form of a triangle.

4. The method according to claim 3, comprising selecting a strip of a kind having edge surfaces facing in opposite directions perpendicularly to the direction in which said one side of the strip is facing, said cross section of each ridge having one side of said triangle in alignment with one of said edge surfaces.

5. The method according to claim 1, comprising selecting a strip having said ridges placed and dimensioned such that, upon complete melting of the ridges due to said conducting of a current between the welding electrodes in the welding area, melted material of the ridges flows outside the edges of the strip and forms weld joints between the strip and the separation disc situated at least partly outside said edges.

6. The method according to claim 1, comprising adapting the current conducted between the welding electrodes such that the two ridges melt completely in the welding area, a contact area being created between the strip and the separation disc, when a portion of the strip situated between the ridges comes into contact with the separation disc, said contact area having a size such that the current is insufficient for continued melting of the strip.

7. The method according to claim 1, comprising selecting a strip whose side opposite said one side of the strip is planar.

* * * * *

UNITED STATES PATENT AND TRADEMARK OFFICE
CERTIFICATE OF CORRECTION

PATENT NO. : 5,883,354
DATED : Mar. 16, 1999
INVENTOR(S) : John Elofson

It is certified that error appears in the above-identified patent and that said Letters Patent is hereby corrected as shown below:

Col. 1, line 14, change "the:strips" to --the strips--.

Col. 2, line 30, delete "of" after the word "obtaining".

Col. 7, lines 21-22, delete "a width not more than this".

51973.N11

Signed and Sealed this

Third Day of April, 2001

Attest:

NICHOLAS P. GODICI

Attesting Officer

Acting Director of the United States Patent and Trademark Office